(12) United States Patent
Lee et al.

(10) Patent No.: US 12,468,408 B2
(45) Date of Patent: Nov. 11, 2025

(54) ACTIVE PEN SENSING DEVICE, A SENSING DRIVING METHOD, AND A DISPLAY DEVICE

(71) Applicant: LX SEMICON CO., LTD., Daejeon (KR)

(72) Inventors: Jae Hwan Lee, Daejeon (KR); Jeong Kwon Nam, Daejeon (KR); Jung Hwan Park, Daejeon (KR); Jun Young Lee, Daejeon (KR); Hyun Soo Chung, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/774,358

(22) Filed: Jul. 16, 2024

(65) Prior Publication Data

US 2025/0060841 A1    Feb. 20, 2025

(30) Foreign Application Priority Data

Aug. 17, 2023   (KR) .......................... 10-2023-0107836

(51) Int. Cl.
  *G06F 3/0354*  (2013.01)
  *G06F 3/041*  (2006.01)
  *G06F 3/044*  (2006.01)

(52) U.S. Cl.
  CPC ...... *G06F 3/03545* (2013.01); *G06F 3/04164* (2019.05); *G06F 3/0446* (2019.05)

(58) Field of Classification Search
  CPC . G06F 3/03545; G06F 3/0446; G06F 3/04164
  See application file for complete search history.

(56) References Cited

U.S. PATENT DOCUMENTS

| | | | |
|---|---|---|---|
| 11,687,174 B2* | 6/2023 | Watanabe | G06F 3/0441 345/179 |
| 2013/0207938 A1* | 8/2013 | Ryshtun | G06F 3/0441 178/19.03 |
| 2019/0095006 A1* | 3/2019 | Shahparnia | G06F 3/04162 |
| 2020/0201505 A1* | 6/2020 | Jung | G06F 3/0383 |
| 2022/0027012 A1* | 1/2022 | Kim | G06F 3/0448 |

FOREIGN PATENT DOCUMENTS

KR   10-2018-0003734 A   1/2018

OTHER PUBLICATIONS

Extended European Search Report issued for European Application No. 24175318.5 on Oct. 7, 2024, 11 pages.

* cited by examiner

*Primary Examiner* — Afroza Chowdhury
(74) *Attorney, Agent, or Firm* — ROTHWELL, FIGG, ERNST AND MANBECK, P.C.

(57) ABSTRACT

An active pen sensing device, a display device comprising same and a sensing driving method are provided; and the active pen sensing device can include a plurality of division blocks divided into a matrix along a first direction and a second direction intersecting the first direction, each of which comprises a plurality of sensing cells, a plurality of first sensing lines connected to the plurality of sensing cells of each of the plurality of division blocks along the first direction, a plurality of second sensing lines connected to the plurality of sensing cells of each of the plurality of division blocks along the second direction, and a sensing driving device connected to the plurality of first sensing lines and the plurality of second sensing lines to drive the plurality of division blocks.

18 Claims, 13 Drawing Sheets

ACTIVE PEN SENSING DEVICE, A SENSING DRIVING METHOD, AND A DISPLAY DEVICE

CROSS-REFERENCE TO RELATED APPLICATIONS

The present application claims the benefit of priority to Korean Patent Application No. 10-2023-0107836, filed on Aug. 17, 2023, which is incorporated herein by reference in its entirety.

THE BACKGROUND

1. The Field

The embodiments relate to an active pen sensing device, a sensing driving method, and a display device.

2. Description of the Related Art

Recently, display devices with an object sensing function that can recognize a touch by an object or the proximity of the object have been widely used. These display devices have various sizes, such as small electronic devices (e.g., smartphones) or large electronic devices (e.g., TVs, kiosks, or electronic whiteboards).

The display device includes a plurality of sensing cells provided on a panel. The display device displays an image on the panel and performs object sensing using the plurality of sensing cells.

Meanwhile, a stylus pen as an object is used as an input device in various display devices. The stylus pen has an advantage of allowing more detailed input than fingers. The stylus pen is divided into a passive type stylus pen (hereinafter referred to as passive pen) and an active type stylus pen (hereinafter referred to as active pen). The passive pen has a disadvantage of making it difficult to detect the touch location because there is little change in capacitance at the contact point with the panel. On the other hand, since the active pen outputs its own driving signal to the contact point with the panel, it has the advantage of being easier to detect the touch location than the passive pen, and its use is increasing.

Meanwhile, the panel requires increasingly higher resolution and higher driving frequency. Typically, at least two sections are always used for each active pen sensing section to recognize a touch by an active pen or the proximity of the active pen. That is, a driving signal is provided on the panel during a first section and a sensing signal is received from the panel during a second section. Therefore, in order to meet the requirements of the panel, the entire section of the first section and the second section needs to be reduced.

Meanwhile, in order to recognize a touch by the active pen or the proximity of the active pen, all sensing lines provided on the panel must be activated at all times. Here, activation means that an electrical signal is provided to the corresponding sensing line. That is, for each active pen sensing section, driving signals are provided to a plurality of first sensing lines on the panel and sensing signals are received from a plurality of second sensing lines on the panel. As such, there is a problem that power consumption increases as all sensing lines are always activated. In particular, even if the active pen is recognized, all sensing lines on the panel are activated without locally sensing the area where the active pen is located, resulting in a further increase in power consumption.

THE SUMMARY

An object of the embodiment is to solve the foregoing and other problems.

Another object of the embodiment is to provide an active pen sensing device, a sensing driving method, and a display device that can reduce sensing time.

Another object of the embodiment is to provide an active pen sensing device, a sensing driving method, and a display device that can reduce power consumption.

The technical problems of the embodiments are not limited to those described in this item and include those that can be understood through the description of the invention.

According to the first aspect of the embodiment to achieve the above or other objects, an active pen sensing device, comprising: a plurality of division blocks divided into a matrix along a first direction and a second direction intersecting the first direction, each of which comprises a plurality of sensing cells; a plurality of first sensing lines connected to the plurality of sensing cells of each of the plurality of division blocks along the first direction; a plurality of second sensing lines connected to the plurality of sensing cells of each of the plurality of division blocks along the second direction; and a sensing driving device connected to the plurality of first sensing lines and the plurality of second sensing lines to drive the plurality of division blocks, wherein the sensing driving device is configured to: detect the presence or absence of the active pen by activating the plurality of first sensing lines, when the active pen is detected, detect the coordinates of the active pen by activating the plurality of first sensing lines and the plurality of second sensing lines, and when the coordinates of the active pen are detected, perform local sensing by activating the first sensing lines and the second sensing lines connected to a specific division block where the active pen is located and first neighboring division blocks.

A second active pen sensing section can comprise a first section and a second section, and when the active pen is detected, the sensing driving device can provide a driving signal to the plurality of first sensing lines during the first section and receive a second sensing signal through the plurality of second sensing lines during the second section.

When the coordinates of the active pen are detected, the sensing driving device can determine the first neighboring division blocks based on a current location of the active pen from a center point of the specific division block.

According to a second aspect of the embodiment to achieve the above or other objects, a sensing driving method in an active pen sensing device comprising a plurality of division blocks divided into a matrix along a first direction and a second direction intersecting the first direction, each of which comprises a plurality of sensing cells, a plurality of first sensing lines connected to the plurality of sensing cells of each of the plurality of division blocks along the first direction, a plurality of second sensing lines connected to the plurality of sensing cells of each of the plurality of division blocks along the second direction, and a sensing driving device connected to the plurality of first sensing lines and the plurality of second sensing lines to drive the plurality of division blocks, comprising: detecting the presence or absence of the active pen by activating the plurality of first sensing lines; when the active pen is detected, detecting the coordinates of the active pen by activating the plurality of first sensing lines and the plurality of second sensing lines;

and when the coordinates of the active pen are detected, performing local sensing by activating the first sensing lines and the second sensing lines connected to a specific division block where the active pen is located and first neighboring division blocks.

A second active pen sensing section can comprise a first section and a second section, and when the active pen is detected, the detecting of the coordinates of the active pen can comprises providing a driving signal to the plurality of first sensing lines during the first section and receiving a second sensing signal through the plurality of second sensing lines during the second section.

The performing of the local sensing can comprise determining the first neighboring division blocks based on a current location of the active pen from a center point of the specific division block when the coordinates of the active pen are detected.

According to a third aspect of the embodiment, a display device comprises the active pen sensing device.

The effects of the active pen sensing device, the sensing driving method, and the display device according to the embodiment are described as follows.

According to at least one of the embodiments, the section for detecting the presence or absence of an active pen and local sensing can be significantly shortened compared to the sensing section (T in FIG. 3) in the related art. Therefore, the requirements for high-resolution display and even higher driving frequency can be met.

According to at least one of the embodiments, there is an advantage that since the local sensing is performed on a specific division block where the active pen is located and the neighboring division blocks among a plurality of division blocks, power consumption can be dramatically reduced.

According to at least one of the embodiments, during the local sensing of a specific division block and the neighboring division blocks, a sensing signal can be received not only through second sensing lines but also through the first sensing signal connected to the specific division block and the neighboring division blocks. Therefore, more precise and accurate local sensing is possible based on the third sensing signal received from the first sensing lines and the fourth sensing signal received from the second sensing lines, thereby preventing errors due to sensing detection in advance.

According to at least one of the embodiments, as the active pen moves, a new specific division block and new neighboring division blocks can be determined, and the previous specific division block and the previous neighboring division blocks can be excluded. Accordingly, power consumption can be significantly reduced by performing local sensing on a small number of division blocks composed of the new specific division block and the neighboring division blocks. In addition, local sensing and follow-up operations to the local sensing can be performed quickly, so that the sensing processing time can be shortened.

Additional scope of applicability of the embodiments will become apparent from the detailed description that follows. However, since various changes and modifications within the spirit and scope of the embodiments may be clearly understood by those skilled in the art, the detailed description and specific embodiments, such as preferred embodiments, should be understood as being given by way of example only.

THE DETAILED DESCRIPTION

Figure 1:
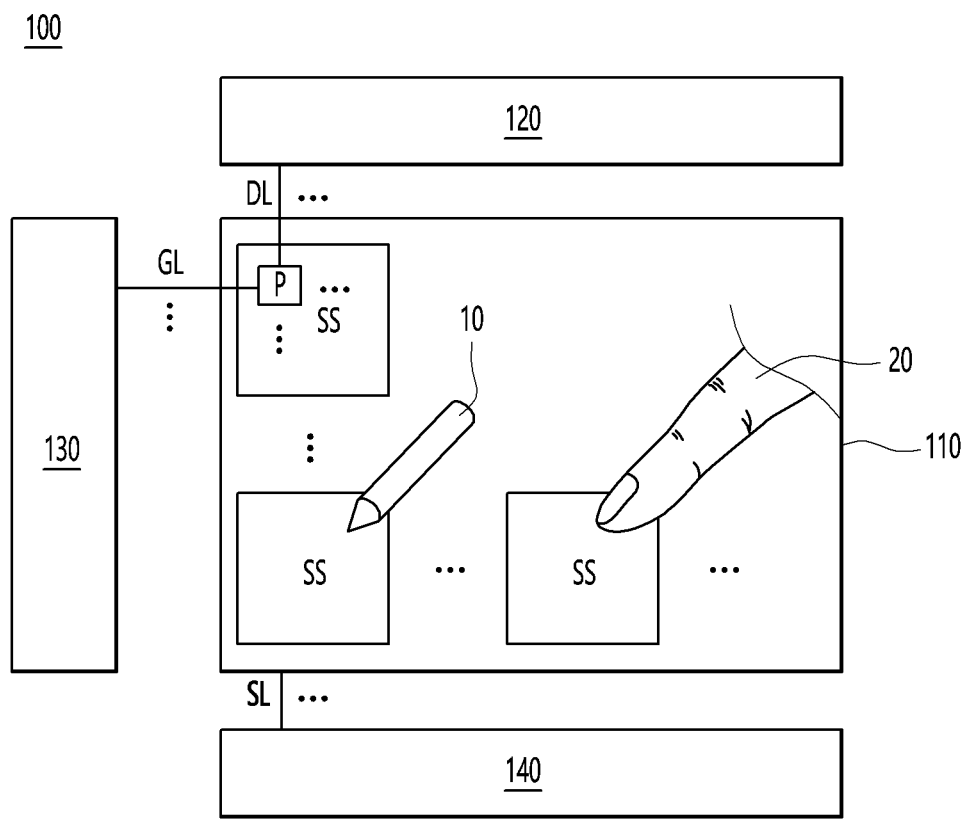
FIG. 1 is a configuration diagram of a display device according to an embodiment.

Hereinafter, the embodiment disclosed in this specification will be described in detail with reference to the accompanying drawings, but the same or similar elements are given the same reference numerals regardless of reference numerals, and redundant descriptions thereof will be omitted. The suffixes 'module' and 'unit' for the elements used in the following descriptions are given or used interchangeably in consideration of ease of writing the specification, and do not themselves have a meaning or role that is distinct from each other. In addition, the accompanying drawings are for easy understanding of the embodiment disclosed in this specification, and the technical idea disclosed in this specification is not limited by the accompanying drawings. Also, when an element such as a layer, region or substrate is referred to as being 'on' another element, this means that there can be directly on the other element or be other intermediate elements therebetween.

FIG. 1 is a configuration diagram of a display device according to an embodiment. Referring to FIG. 1, the display device 100 according to an embodiment can comprise a panel 110, a data driving device 120, a gate driving device 130, a sensing driving device 140, etc.

In an embodiment, the panel 110 can comprise a liquid crystal display panel, an organic light emitting display panel, etc., but is not limited thereto.

The panel 110 can comprise a plurality of gate lines GL, a plurality of data lines DL, and a plurality of pixels P. The plurality of gate lines GL can be connected to the gate driving device 130. The plurality of data lines DL can be connected to the data driving device 120. The plurality of pixels P can be connected to the plurality of gate lines GL and the plurality of data lines DL. A pixel P can comprise a plurality of sub-pixels. For example, the pixel P can comprise a first subpixel that emits red light, a second subpixel that emits green light, a third subpixel that emits blue light, etc.

Meanwhile, the panel 110 can comprise a plurality of sensing cells SS. In an embodiment, the sensing cell SS can be implemented in an in-cell method, an on-cell method, an add-on method, etc. For example, when a plurality of pixels P are defined between a lower substrate and an upper substrate, in the in-cell method, a sensing cell SS is provided inside or around the pixel P, and in the on-cell method, the sensing cell SS can be provided on the upper substrate. In addition, in the add-on method, the sensing cell SS can be above the upper substrate and spaced apart from the upper substrate. In the in-cell method, the display panel and the sensing panel can be implemented integrally. In the on-cell method or the add-on method, the display panel and the sensing panel can be independently separated.

The sensing cell SS can comprise a sensing electrode. The sensing electrode can comprise a first sensing electrode and a second sensing electrode, but is not limited thereto. A predetermined capacitance can be formed between the first sensing electrode and the second sensing electrode. A driving signal can be provided to the first sensing electrode, and a sensing signal can be output from the second sensing electrode. When an object touches the sensing cell SS or an object approaches the sensing cell SS, the capacitance between the first and second sensing electrodes changes, and the changed capacitance can be output as a sensing signal. The objects can comprise hands, fingers 20, active pens 10, etc. An object sensing can be performed by providing only one sensing electrode without being divided into the first sensing electrode and the second sensing electrode.

The display panel and the sensing panel can share some components with each other. As an example, the display panel and the sensing panel can share the upper substrate.

As another example, the sensing electrode constituting the sensing cell SS in the sensing panel and the common electrode constituting the pixel P in the display panel can be shared with each other.

As another example, the sensing electrode constituting the sensing cell SS in the sensing panel and the common electrode constituting the pixel P in the display panel can be provided independently without being shared with each other.

Meanwhile, the data driving device 120 can supply a data signal to the data line DL to display an image signal to each pixel P of the panel 110.

The gate driving device 130 can sequentially provide scan signals to a plurality of gate lines GL to turn on or off the transistor located in each pixel P.

Depending on the driving method, the gate driving device 130 can be located on only one side of the panel 110 as shown in this drawing, or can be divided into two and located on both sides of the panel 110.

The sensing driving device 140 can supply a driving signal to all or part of the plurality of sensing cells SS connected to the plurality of sensing lines SL. Although not shown, the sensing lines SL can comprise a first sensing line and a second sensing line. For example, the first sensing line can be connected to the first sensing electrode of the sensing cell SS, and the second sensing line can be connected to the second sensing electrode of the sensing cell SS. The first sensing line can provide a driving signal generated by the sensing driving device 140 to the first sensing electrode of the sensing cell SS. The second sensing line can provide a sensing signal output from the second sensing electrode of the sensing cell SS to the sensing driving device 140. The first sensing line can be called a transmission sensing line, and the second sensing line can be called a reception sensing line. An object sensing can be performed by providing only one sensing line without being divided into the first sensing line and the second sensing line.

As an example, the sensing driving device 140 can be configured separately from the data driving device 120 and the gate driving device 130. For example, the data driving device 120, the gate driving device 130, and the sensing driving device 140 can each be configured as individually integrated circuits. As another example, depending on the implementation method, the sensing driving device 140 can be included in the data driving device 120 or the gate driving device 130. As another example, the data driving device 120, the gate driving device 130, and the sensing driving device 140 can be configured as one integrated circuit.

This sensing driving device 140 is not limited in implementation and design method, and can be a different configuration itself or can be provided inside or outside of another configuration as long as the function performed is the same or similar in the embodiment.

Although one sensing driving device 140 is provided in the drawing, two or more sensing driving devices 140 can be provided.

Meanwhile, the display device 100 can adopt a capacitance-type object sensing method that recognizes the touch or proximity of an object by detecting changes in capacitance through the sensing cell SS.

As an example, the capacitance type object sensing method can be divided into a mutual-capacitance type object sensing method and a self-capacitance type object sensing method.

The display device 100 can adopt one of two types of capacitance type object sensing methods described above, that is, the mutual capacitance type object sensing method and the self-capacitance type object sensing method. Hereinafter, for convenience of explanation, embodiments will be described assuming that a mutual capacitance type object sensing method is adopted.

The sensing driving device 140 can drive the panel 110 to recognize a touch by the finger 20 or the active pen 10 or the proximity of the finger 20 or the active pen 10.

Figure 2:
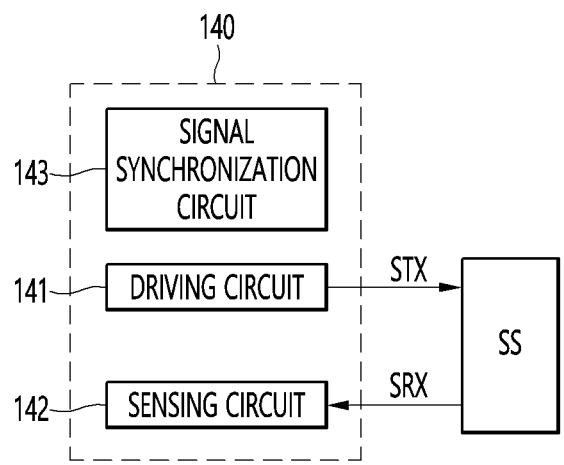
FIG. 2 is a configuration diagram of the sensing driving device of FIG. 1.

Referring to FIG. 2, the sensing driving device 140 can comprise a driving circuit 141 and a sensing circuit 142. The driving circuit 141 and/or the sensing circuit 142 can be configured as an integrated circuit. The driving circuit 141 and the sensing circuit 142 can be integrated into one integrated circuit or into individual integrated circuits.

The driving circuit 141 can provide a driving signal STX to the sensing cell SS on the panel 110. For example, the driving circuit 141 can supply the driving signal STX to one or more sensing cells SS connected to each of the plurality of first sensing lines on the panel 110, but is not limited thereto.

The driving signal STX can be a voltage signal or a current signal. The driving signal STX can have a pulse-shaped waveform. The pulse-shaped waveform can be of various types, such as a stationary wave or a square wave. Hereinafter, for convenience of explanation, embodiments will be described assuming that a driving signal STX having a square wave is used.

The driving signal STX can be an uplink signal and can be a signal for synchronizing the active pen 10. The uplink signal can comprise panel information of the panel 110, protocol version, synchronization signal, etc. For example, the uplink signal can be provided to the sensing cell SS on the panel 110 as the driving signal STX. When the active pen 10 approaches the panel 110, the active pen 10 can receive the uplink signal from the sensing cell SS. The active pen 10 can be synchronized based on the uplink signal and then transmit a downlink signal to the sensing cell SS. The downlink signal can be provided from the sensing cell SS to the sensing circuit 142, so that the active pen 10 can be recognized.

Meanwhile, the driving signal STX can be used to recognize a touch by the finger 20 or the active pen or the proximity of the finger 20 or the active pen. That is, the driving signal STX can be provided to the sensing cell SS, and the sensing signal can be provided from the sensing cell SS to the sensing circuit 142, so that a touch by the finger 20 or the active pen or the proximity of the finger 20 or the active pen can be recognized.

Although not shown, one frame comprises a sensing section for sensing the finger 20 (hereinafter referred to as the finger sensing section) and a sensing section for sensing the active pen 10 (hereinafter referred to as the active pen sensing section), but is not limited thereto.

Meanwhile, the sensing circuit 142 can receive a sensing signal SRX corresponding to the driving signal STX comprising an uplink signal, etc. from one or two more sensing cell SS connected to each of the plurality of second sensing lines on the panel 110. The sensing circuit 142 can sense or detect a touch or proximity of an object, such as a finger 20 or an active pen 10, to the panel 110 based on the sensing signal SRX.

The sensing circuit 142 can generate sensing data T_DATA according to the sensing signal SRX.

The sensing data T_DATA can comprise a sensing value generated by demodulating the sensing signal SRX. For example, the sensing value can be a time integral value of the current or voltage of the sensing signal SRX. The sensing value can be used to determine the presence or absence of the object on the panel 110 or to generate object coordinates. For example, when the sensing value is greater or smaller than the reference value, it can be determined that a touch by an object has occurred or the object can be judged to be close.

Meanwhile, the sensing driving device 140 can comprise a signal synchronization circuit 143. The signal synchronization circuit 143 can synchronize the reception timing to the transmission timing of the active pen 10 using a partial section of the downlink signal.

Although not shown, the sensing driving device 140 can comprise a signal generator. The signal generator can generate a driving signal STX supplied to the sensing cell SS on the panel 110.

Although not shown, the sensing driving device 140 can comprise a controller such as a microcontroller unit (MCU) and memory.

The signal synchronization circuit 143, the driving circuit 141, and the sensing circuit 142 can be called a signal synchronization unit, a driving unit, and a sensing unit, respectively. The signal synchronization circuit 143, the driving circuit 141, and the sensing circuit 142 can be configured as individual integrated circuits or can be configured as a single integrated circuit. The signal synchronization circuit 143, the driving circuit 141, the sensing circuit 142, etc. can be provided inside the sensing driving device 140, but can be provided inside the data driving device 120 or the gate driving device 130.

Figure 3:
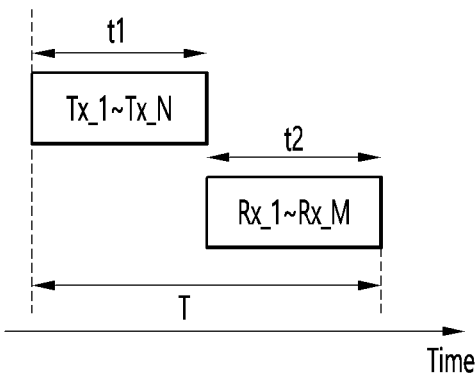
FIG. 3 shows a sensing time of an active pen according to the related art.

Meanwhile, as shown in FIG. 3, according to the related art, the sensing section T for sensing the active pen 10 is divided into a first section t1 and a second section t2. The sensing section T is a time section corresponding to one frame. In this instance, the driving signal STX is provided to the plurality of sensing cells SS through the plurality of first sensing lines Tx_1 to Tx_N on the panel 110 during the first section t1. During the second section t2, the sensing signal SRX is received from a plurality of sensing cells SS through a plurality of second sensing lines Rx_1 to Rx_M.

Recently, the panel 110 is required to have higher resolution and higher driving frequency. Therefore, in order to meet the requirements of the panel 110, the sensing section T used in the related art must be further shortened.

Meanwhile, for detecting the presence or absence of the active pen 10, detecting the coordinates of the active pen 10, and operating the active pen 10, etc., as mentioned above, a plurality of first sensing lines and a plurality of second sensing lines on the panel 110 are always activated by an active pen sensing section T consisting of a first section t1 and a second section t2 as a cycle. That is, electric signals are always provided to the plurality of first sensing lines and the plurality of second sensing lines, thereby increasing power consumption. In particular, even when the location of the active pen 10 is confirmed through detecting the coordinates of the active pen 10, the plurality of first sensing lines and the plurality of second sensing lines on the entire area of the panel 110 are still activated, so that power consumption increases further.

The embodiments described below are intended to solve the above-mentioned problems, and various embodiments are described with reference to FIGS. 4 to 13(b). In the following description, reference numerals omitted from the corresponding drawings can be adopted from the preceding drawings (FIGS. 1 to 3).

Figure 4:
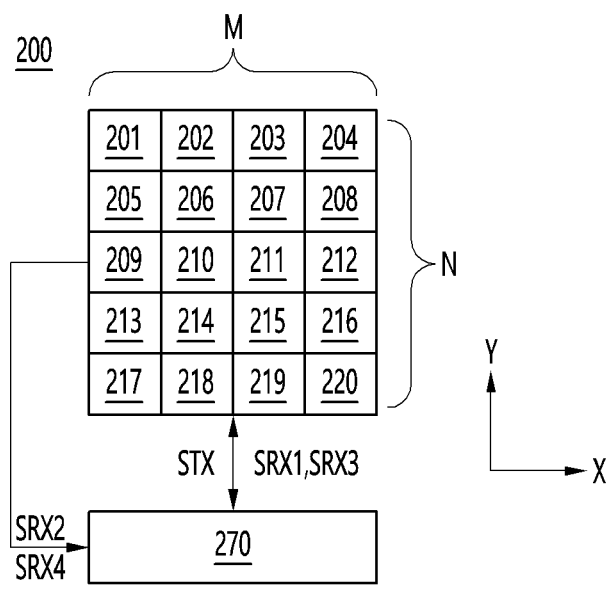
FIG. 4 shows an active pen sensing device according to an embodiment.

FIG. 4 shows an active pen sensing device according to an embodiment.

Referring to FIG. 4, the active pen sensing device 200 according to an embodiment can comprise a plurality of division blocks 201 to 220, a sensing driving device 270, etc. The sensing driving device 270 can be the sensing driving device 140 shown in FIGS. 1 and 2, but is not limited thereto. The division blocks 201 to 220 can be called a division group. Additionally, the division blocks 201 to 220 can also be called blocks. In the following description, the blocks, the division blocks 201 to 220, and the division group can be used interchangeably.

As an example, a plurality of division blocks 201 to 220 can be located on the panel 110. The panel 110 can comprise a display panel and a sensing panel. When the sensing panel is integrated with the display panel, that is, in the case of an in-cell method, a plurality of division blocks 201 to 220 can be located in the display panel. When the sensing panel is provided separately from the display panel, that is, when the sensing panel is an on-cell method or an add-on method, a plurality of division blocks 201 to 220 can be located on the sensing panel.

As another example, the plurality of division blocks 201 to 220 can be located on a member other than the panel 110. The member can be an electronic device or a circuit board that performs a predetermined operation using data signals. In this instance, the plurality of division blocks 201 to 220 can be located on a sensing panel, and the corresponding sensing panel can be mounted on the member.

Meanwhile, the plurality of division blocks 201 to 220 can be divided into a matrix.

The plurality of division blocks 201 to 220 can be divided along a first direction, that is, the Y direction. N division blocks can be divided along the first direction. For example, it can be divided into five division blocks along the first direction.

The plurality of division blocks 201 to 220 can be divided along a second direction, that is, the X direction. M division blocks can be split along the second direction. For example, it can be divided into four division blocks along the second direction.

For convenience, the drawing shows five division blocks divided along the first direction and four division blocks divided along the second direction, but more division blocks can be divided in each of the first and second directions.

Meanwhile, the sensing driving device 270 can drive a plurality of division blocks 201 to 220. The sensing driving device 270 can simultaneously drive a plurality of division blocks 201 to 220 at the same time, but is not limited thereto.

The sensing driving device 270 can drive a plurality of division blocks 201 to 220 to detect the presence or absence of the active pen 10, detect the coordinates of the active pen 10, and perform local sensing for the active pen 10. The detection of the presence or absence of the active pen 10, the detection of the coordinates of the active pen 10, the local sensing of the active pen 10, etc. can be performed in different active pen sensing sections (T1, T2, and T3 in FIG. 7). Here, the active pen sensing sections T1, T2, and T3 can each correspond to one frame, a certain section within one frame, or one section among a plurality of sections of one frame, but is not limited thereto.

For example, the sensing driving device 270 can receive first sensing signals SRX1 from the plurality of division blocks 201 to 220 and detect the presence or absence of the active pen 10.

For example, the sensing driving device 270 can provide driving signals STX to a plurality of division blocks 201 to 220 and receive second sensing signals SRX2 from the plurality of division blocks 201 to 220 to detect the coordinates of the active pen 10. The detection of the coordinates of the active pen 10 can be performed after the presence or absence of the active pen 10 is detected, but is not limited thereto.

For example, the sensing driving device 270 can receive third sensing signals SRX3 and fourth sensing signals SRX4 from the specific division block where the active pen 10 is located and the neighboring division blocks to perform local sensing. The local sensing can be performed after the coordinates of the active pen 10 are detected, but is not limited thereto. The local sensing can be performed on a specific division block and the neighboring division blocks after the specific division block and the neighboring division blocks where the active pen 10 is located are determined based on the coordinates of the active pen 10.

Meanwhile, synchronization with the active pen 10 can be performed before detecting the presence or absence of the active pen 10, but is not limited thereto. That is, the uplink signal can be provided as driving signals STX to a plurality of division blocks 201 to 220. When the active pen 10 approaches a specific division block among the plurality of division blocks 201 to 220, the corresponding active pen 10 can receive an uplink signal and be synchronized. When the synchronized active pen 10 transmits a downlink signal, it can be confirmed that synchronization is complete based on the sensing signal received from a specific division block.

Figure 5:
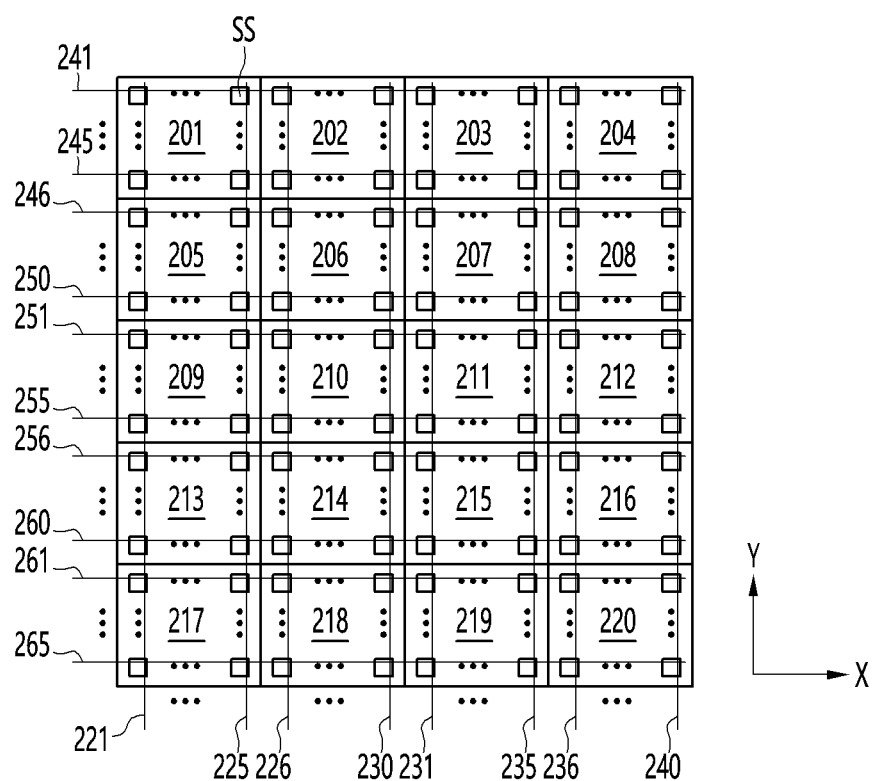
FIG. 5 is a detailed configuration diagram of a plurality of division blocks, a plurality of first sensing lines, and a plurality of second sensing lines of FIG. 4.

FIG. 5 is a detailed configuration diagram of a plurality of division blocks, a plurality of first sensing lines, and a plurality of second sensing lines of FIG. 4.

Referring to FIG. 5, the plurality of division blocks 201 to 220 can each comprise a plurality of sensing cells SS. The plurality of sensing cells SS can be arranged in a matrix in each of the plurality of division blocks 201 to 220, but are not limited thereto. The number of sensing cells SS included in each of the plurality of division blocks 201 to 220 can be the same, but is not limited thereto.

In the drawing, each of the plurality of division blocks 201 to 220 is shown to include five sensing cells SS arranged along a first direction and five sensing cells SS arranged along a second direction. However, fewer or more sensing cells SS can be included.

Each of the plurality of sensing cells SS can comprise a first sensing electrode and a second sensing electrode as described above. In an embodiment, the driving signal STX can be provided to the first sensing electrode, or the first sensing signal SRX1 or the third sensing signal SRX3 can be received from the first sensing electrode. In an embodiment, the second sensing signal SRX2 or the fourth sensing signal SRX4 can be received from the second sensing electrode. For example, the first sensing signal SRX1 can be used to detect the presence or absence of the active pen 10. For example, the driving signal STX and the second sensing signal SRX2 can be used to detect the coordinates of the active pen 10. For example, the third sensing signal SRX3 and/or the fourth sensing signal SRX4 can be used to perform local sensing on a specific division block where the active pen 10 is located and the neighboring division blocks.

According to the embodiment, the active pen sensing device 200 can comprise a plurality of first sensing lines 221 to 240 and a plurality of second sensing lines 241 to 265.

The plurality of first sensing lines 221 to 240 can be arranged along the first direction. The plurality of first sensing lines 221 to 240 can be arranged along the first direction and connected to the plurality of sensing cells SS of each of the plurality of division blocks 201 to 220. The plurality of first sensing lines 221 to 240 can be connected to the first sensing electrode of each of the plurality of sensing cells SS, but are not limited thereto.

The plurality of second sensing lines 241 to 265 can be arranged along the second direction. The plurality of second sensing lines 241 to 265 can be arranged along the second direction and connected to the plurality of sensing cells SS of each of the plurality of division blocks 201 to 220. The plurality of second sensing lines 241 to 265 can be connected to the second sensing electrode of each of the plurality of sensing cells SS, but are not limited thereto.

Meanwhile, as shown in FIGS. 4 and 5, a plurality of first sensing lines 221 to 240 can be connected to the sensing driving device 270. The plurality of second sensing lines 241 to 265 can be connected to the sensing driving device 270. Accordingly, electrical signals can be provided from the sensing driving device 270 to the sensing cells SS of each of the plurality of division blocks 201 to 220 or from the sensing cells SS of each of the plurality of division blocks 201 to 220 to the sensing driving device 270 through the plurality of first sensing lines 221 to 240 and the plurality of second sensing lines 241 to 265.

Providing the electrical signals to the plurality of first sensing lines 221 to 240 can mean that the plurality of first sensing lines 221 to 240 are activated. Not providing the electrical signals to the plurality of first sensing lines 221 to 240 can mean that the plurality of first sensing lines 221 to 240 are inactivated.

Providing the electrical signals to the plurality of second sensing lines 241 to 265 can mean that the plurality of second sensing lines 241 to 265 are activated. Not providing the electrical signals to the plurality of second sensing lines 241 to 265 can mean that the plurality of second sensing lines 241 to 265 are inactivated.

As an example, the driving signals STX can be provided from the sensing driving device 270 to the sensing cell SS of each of the plurality of division blocks 201 to 220 through the plurality of first sensing lines 221 to 240. As another example, the first sensing signals SRX1 or the third sensing signals SRX3 can be provided to the sensing driving device 270. For example, the first sensing signals SRX1 or the third sensing signals SRX3 can be provided to the sensing driving device 270 from the first sensing electrode of each sensing cell SS. As another example, the second sensing signals SRX2 or the fourth sensing signals SRX4 can be provided to the sensing driving device 270 from the sensing cells SS of each of the plurality of division blocks 201 to 220. For example, the second sensing signals SRX2 or the fourth sensing signals SRX4 can be provided to the sensing driving device 270 from the second sensing electrode of each sensing cell SS.

Figure 6:
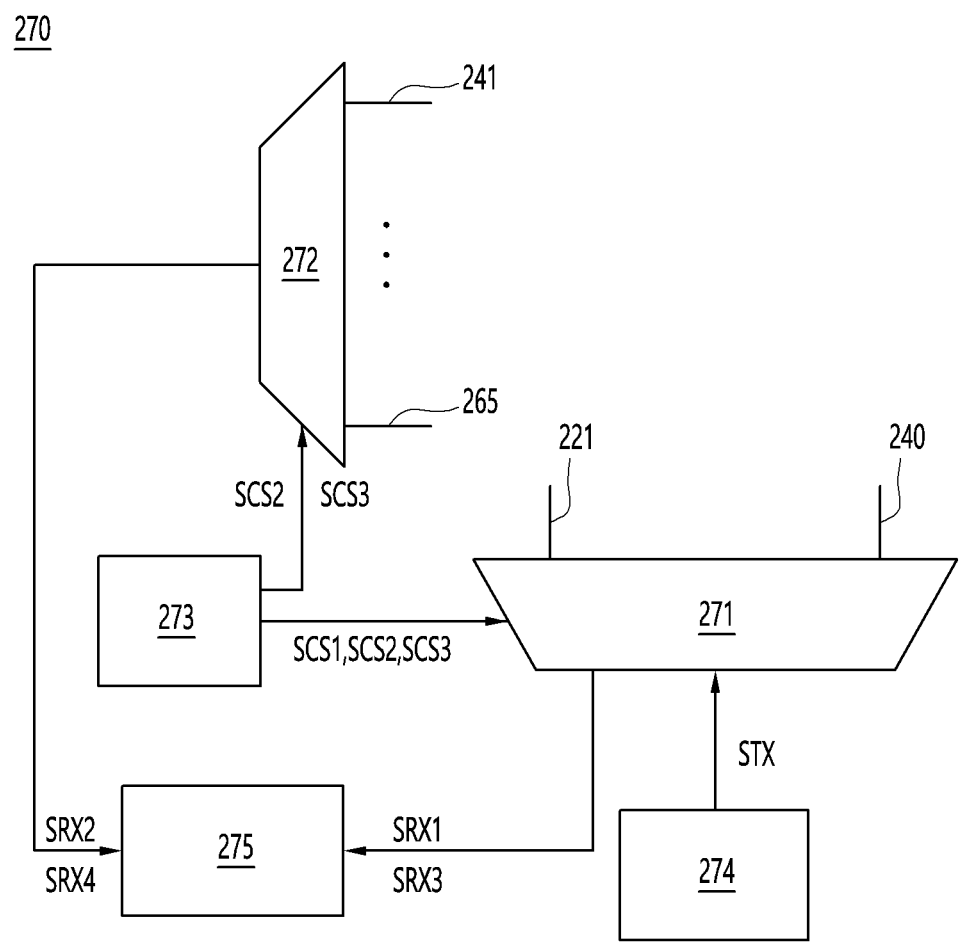
FIG. 6 is a detailed configuration diagram of the sensing driving device of FIG. 4.

FIG. 6 is a detailed configuration diagram of the sensing driving device of FIG. 4.

Referring to FIG. 6, the sensing driving device 270 can comprise a first multiplexer 271, a second multiplexer 272, and a sensing controller 273. The sensing driving device 270 can comprise a signal generator 274 and a sensing circuit 275. The sensing driving device 270 can comprise more components than these.

The signal generator 274 can generate a driving signal STX and provide the driving signal STX to the first multiplexer 271. The sensing circuit 275 can receive a sensing signal from each of a plurality of first sensing lines 221 to 240 or the plurality of second sensing lines 241 to 265, that is, a first sensing signal SRX1 to a fourth sensing signal SRX4 via the first multiplexer 271 or the second multiplexer 272.

The first multiplexer 271 can be connected to the signal generator 274, the sensing circuit 275, and the plurality of first sensing lines 221 to 240. The first multiplexer 271 is connected to the signal generator 274 and the sensing circuit 275, and can be connected to a plurality of first sensing lines 221 to 240. The first multiplexer 271 can selectively connect the signal generator 274 and the sensing circuit 275. For example, when the first multiplexer 271 is selected to be connected to the signal generator 274, the driving signal STX of the signal generator 274 can provided to the plurality of first sensing lines 221 to 240 through the first multiplexer 271. For example, when the first multiplexer 271 is selected to be connected to the sensing circuit 275, the first sensing signal SRX1 or the third sensing signal SRX3 of each of the plurality of first sensing lines 221 to 240 can be provided to the sensing circuit 275 via the first multiplexer 271.

The second multiplexer 272 can be connected to the sensing circuit 275 and the plurality of second sensing lines 241 to 265. The second multiplexer 272 can be connected to the sensing circuit 275 and can be connected to a plurality of second sensing lines 241 to 265. The second sensing signal SRX2 or the fourth sensing signal SRX4 of each of the plurality of second sensing lines 241 to 265 can be provided to the sensing circuit 275 via the second multiplexer 272.

As an example, the sensing circuit 275 can detect the presence or absence of the active pen 10 based on the first sensing signal SRX1. Additionally, the sensing circuit 275 can obtain an X-axis coordinate value among the coordinates of the active pen 10 based on the first sensing signal SRX1.

As another example, the sensing circuit 275 can detect the coordinates of the active pen 10 based on the second sensing signal SRX2. For example, the sensing circuit 275 can detect the XY coordinates of the active pen 10 using the X-axis coordinate value and the Y-axis coordinate value, and obtain current location information of the active pen 10 based on the XY coordinates of the active pen 10. At this time, the current location of the active pen 10 can be located on a specific sensing cell SS among the plurality of sensing cells SS of a specific division block among the plurality of division blocks 201 to 220.

Meanwhile, information about the center point of each of the plurality of division blocks 201 to 220, for example, center coordinate information, can be obtained in advance and stored in a storage unit. In this case, the sensing circuit 275 can obtain information about how far the active pen 10 is from the center of a specific division block, the movement direction of the active pen 10, etc. based on the current location information of the active pen 10 and the center coordinate information of the specific division block where the active pen 10 is located.

Meanwhile, the first to fourth sensing signals SRX1 to SRX4 received by the sensing circuit 275 can be provided to a signal processing device or another arithmetic processing device to perform the functions of the sensing circuit 275 described above.

Meanwhile, the sensing controller 273 can control the first multiplexer 271 and the second multiplexer 272. The sensing controller 273 can generate a first sensing control signal SCS1, a second sensing control signal SCS2, a third sensing control signal SCS3, etc. The first sensing control signal SCS1 can be a control signal for detecting the presence or absence of the active pen 10. The first multiplexer 271 can be controlled by the first sensing control signal SCS1. The second sensing control signal SCS2 can be a control signal for detecting the coordinates of the active pen 10. The first multiplexer 271 and the second multiplexer 272 can be controlled by the second sensing control signal SCS2. The third sensing control signal SCS3 can be a control signal for performing local sensing on a specific division block where the active pen 10 is located and the neighboring division blocks. The first multiplexer 271 and the second multiplexer 272 can be controlled by the third sensing control signal SCS3.

Hereinafter, with reference to FIGS. 7 to 11, a sensing driving method according to an embodiment will be described in detail.

Figure 7:
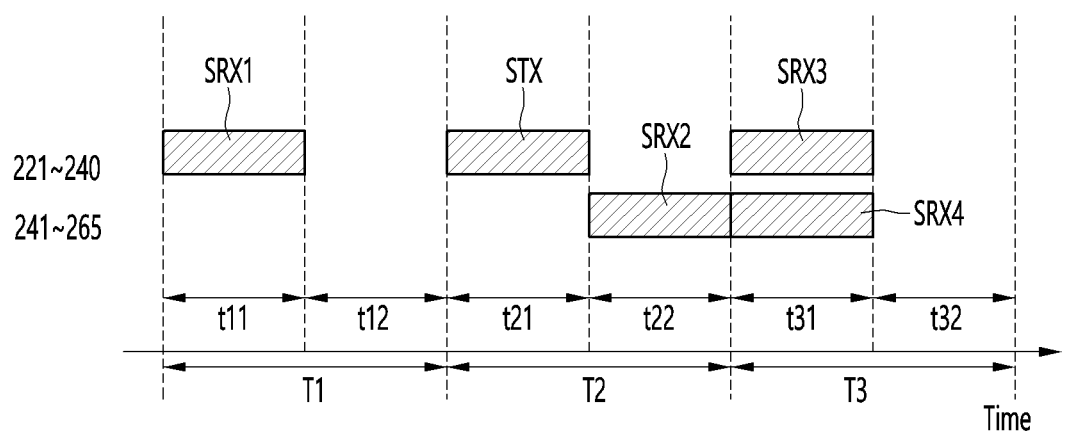
FIG. 7 shows a sensing time of an active pen according to an embodiment.

Although only three active pen sensing sections T1, T2, and T3 are shown in FIG. 7, one or more of the three active pen sensing sections T1, T2, and T3 can be repeated one or more times. As an example, three active pen sensing sections T1, T2, and T3 can each be equal to one frame. As another example, each of the three active pen sensing sections T1, T2, and T3 can be equal to a partial section of one frame. As another example, the three active pen sensing sections T1, T2, and T3 can each be one section or two sections among a plurality of sections constituting one frame. In the drawing, the three active pen sensing sections (T1, T2, and T3) are shown as being contacted with each other, but they may be spaced apart in time.

The first active pen sensing section T1 and the third active pen sensing section T3 are divided into a first section t11 and t31 and a second section t12 and t32. This is to correspond to the sensing section T in the related art shown in FIG. 3, and the second section t12 of the first active pen sensing section T1 and the second section t32 of the third active pen sensing section T3 can be omitted. Accordingly, the first active pen sensing section T1 or the third active pen sensing section T3 is only the first section t11 and t31, and can be reduced by half or more than the second active pen sensing section T2.

As shown in FIG. 7, the presence or absence of the active pen 10 can be detected based on the first sensing signal SRX1 during the first section t11 of the first active pen sensing section T1. The first section t11 of the first active pen sensing section T1 can be repeated until the presence or absence of the active pen 10 is detected, but is not limited thereto.

When the presence or absence of the active pen 10 is detected, the coordinates of the active pen 10 can be detected during the first section t21 and the second section t22 of the second active pen sensing section T2. For example, the driving signal STX can be provided to the plurality of division blocks 201 to 220 during the first section t21 of the second active pen sensing section T2, and the second sensing signal SRX2 can be received from the plurality of division blocks 201 to 220 during the second section t22 of the second active pen sensing section T2, so that the coordinates of the active pen 10 can be detected. When the coordinates of the active pen 10 are detected based on the second sensing signal SRX2 received once, there is no need to repeat the second active pen sensing section T2. If the coordinates of the active pen 10 are not detected based on the second sensing signal SRX2 received once, the second active pen sensing section T2 can be repeated until the coordinates of the active pen 10 are detected.

When the presence or absence of the active pen 10 is detected, a specific division block where the active pen 10 is located and the neighboring division blocks can be determined. Thereafter, local sensing can be performed on the specific division block and the neighboring division blocks during the first section t31 of the third active pen sensing section T3. Accordingly, the local sensing can be performed by repeating the first section t31 of the third active pen sensing section T3. The local sensing can be a sensing method that obtains an input signal of the active pen 10 by narrowing the sensing range to the local area where the active pen 10 is located among the entire area. A delay in the sensing processing time due to the sensing operation being performed on the entire area to obtain the input signal of the active pen 10 can be prevented by performing the local sensing with a narrow sensing range in this way, while power consumption can be reduced by activating only the first sensing lines and the second sensing lines corresponding to the local area.

Detection of Presence or Absence of Active Pen 10

Figure 8:
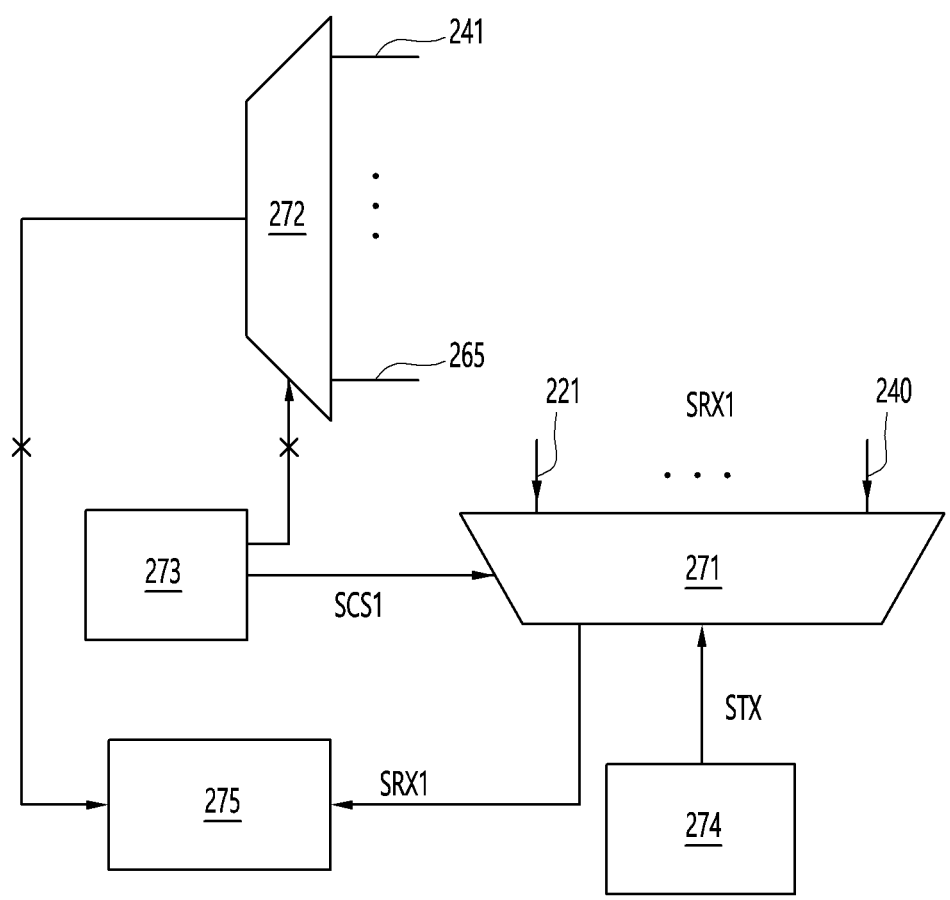
FIG. 8 explains an operation of detecting the presence or absence of an active pen.

Referring to FIGS. 7 and 8, the sensing controller 273 can provide the first sensing control signal SCS1 to the first multiplexer 271 during the first section t11 of the first active pen sensing section T1. At this time, since no control signal is provided to the second multiplexer 272, the second multiplexer 272 may not be operated. The first multiplexer 271 can select the sensing circuit 275 from the sensing circuit 275 and the signal generator 274 according to the first sensing control signal SCS1, so that the sensing circuit 275 can be connected to a plurality of first sensing lines 221 to 240 through the first multiplexer 271. Accordingly, the plurality of first sensing lines 221 to 240 can be activated to provide electrical signals. The active pen 10 can periodically transmit electrical signal. Accordingly, the electrical signal provided from the active pen 10 can be obtained as the first sensing signal SRX1 through the plurality of first sensing lines 221 to 240. The first sensing signal SRX can be larger in an area where the active pen 10 is close to than in another area where the active pen 10 is not located. The first sensing signal SRX1 sensed from each of the plurality of sensing cells SS of each of the plurality of division blocks 201 to 220 can be provided to the sensing circuit 275 via a plurality of first sensing lines 221 to 240 and the first multiplexer 271. The sensing circuit 275 can detect the presence or absence of the active pen 10 based on the first sensing signal SRX1. That is, when the size of the first sensing signal SRX is greater than the set value, it can be recognized that the active pen 10 exists in close proximity. The sensing circuit 275 can obtain an X-axis coordinate value among the coordinates of the active pen 10 based on the first sensing signal SRX1.

Detection of Coordinates of Active Pen 10

Figure 9:
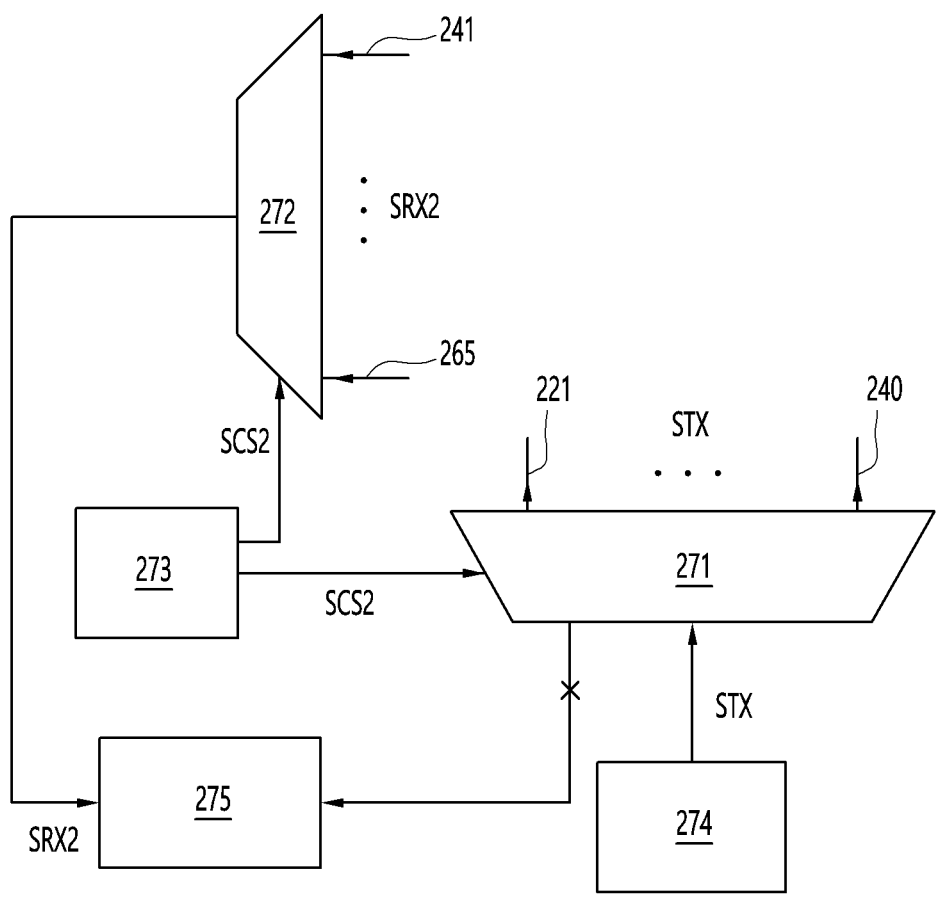
FIG. 9 explains an operation of detecting the coordinates of an active pen.

Referring to FIGS. 7 and 9, the sensing controller 273 can provide the second sensing control signal SCS2 to the first multiplexer 271 during the first section t21 of the second active pen sensing section T2. The first multiplexer 271 can select the signal generator 274 from the sensing circuit 275 and the signal generator 274 according to the second sensing control signal SCS2, so that the signal generator 274 can be connected to a plurality of first sensing lines 221 to 240 through the first multiplexer 271. Accordingly, the plurality of first sensing lines 221 to 240 can be activated to provide electrical signal.

The driving signal STX generated by the signal generator 274 can be provided to a plurality of sensing cells SS of each of the plurality of division blocks 201 to 220 through the first multiplexer 271 and a plurality of first sensing lines 221 to 240.

The sensing controller 273 can provide the second sensing control signal SCS2 to the second multiplexer 272 during the second section t22 of the second active pen sensing section T2. The second multiplexer 272 can connect the sensing circuit 275 to the plurality of second sensing lines 241 to 265 according to the second sensing control signal SCS2. Accordingly, the plurality of second sensing lines 241 to 265 can be activated to provide electrical signal. The second sensing signal SRX2 generated from each of the plurality of sensing cells SS of each of the plurality of division blocks 201 to 220 can be provided to the sensing circuit 275 via a plurality of second sensing lines 241 to 265 and a second multiplexer 272. The sensing circuit 275 can detect the coordinates of the active pen 10 based on the second sensing signal SRX2. A Y-axis coordinate value can be obtained from among the coordinates of the active pen 10 based on the second sensing signal SRX2. Accordingly, the XY coordinates of the active pen 10 can be detected using the X-axis coordinate value and the Y-axis coordinate value, and the coordinate information of the active pen 10 can be stored in a storage unit, etc.

Local Sensing

Before local sensing is performed, a specific division block where the active pen 10 is located and the neighboring division blocks can be determined.

Figure 11:
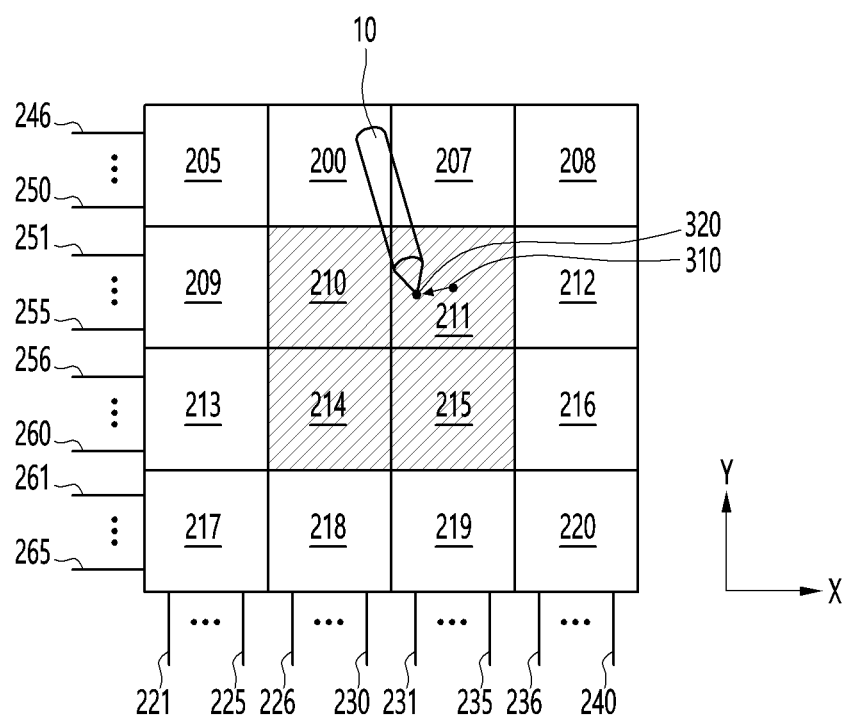
FIG. 11 explains a method of determining neighboring division blocks around a specific division block where the active pen is located.

As shown in FIG. 11, the sensing circuit 275 (or sensing controller 273) can detect the current location 320 of the active pen 10 based on the coordinate information of the active pen 10.

Based on the current location 320 of the active pen 10, the sensing controller 273 can determine the division block in which the active pen 10 is located as a specific division block 211. In addition, the sensing controller 273 can determine the neighboring division blocks 210, 214, and 215 around the specific division block 211 based on the center point coordinate information set in the specific division block 211. For example, the sensing controller 273 can determine the neighboring division blocks 210, 214, and 215 based on the direction between the center point 310 of the specific division block 211 and the current location 320 of the active pen 10.

As shown in FIG. 11, when the active pen 10 is located in the southwest direction from the center point 310 of the specific division block 211, the left division block 210 of the specific division block 211, the division block 214 in the southwest direction, and the lower division block 215 can be determined with neighboring division blocks 210, 214, and 215.

Figure 10:
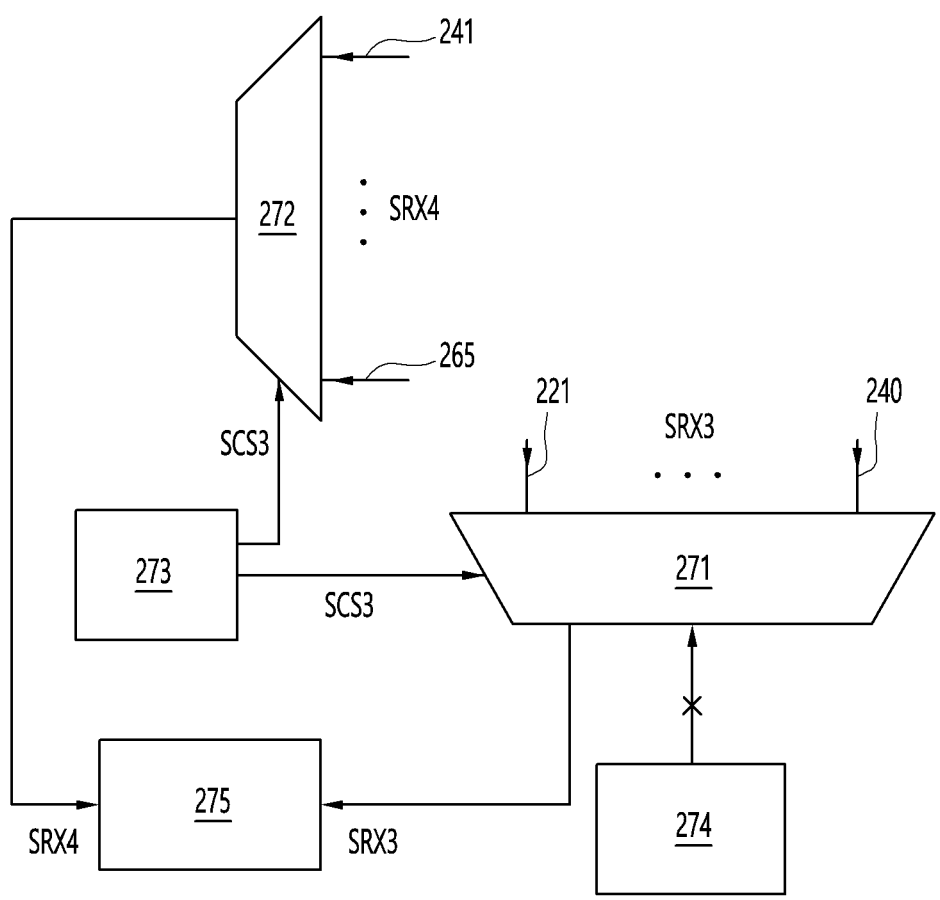
FIG. 10 explains a local sensing operation for an active pen.

Referring to FIGS. 7 and 10, after the specific division block 211 where the active pen 10 is located and the neighboring division blocks 210, 214, and 215 are determined, the sensing controller 273 can provide the third sensing control signal SCS3 to the first multiplexer 271 and the second multiplexer 272 during the first section t31 of the third active pen sensing section T3.

The first multiplexer 271 can select the sensing circuit 275 among the sensing circuit 275 and the signal generator 274 according to the third sensing control signal SCS3, so that the sensing circuit 275 can be connected to a plurality of first sensing lines 221 to 240. Specifically, the first multiplexer 271 can connect the sensing circuit 275 to the first sensing lines 226 to 235 connected to the specific division block 211 and the neighboring division blocks 210, 214, and 215 among the plurality of first sensing lines 221 to 240. Accordingly, the first sensing lines 226 to 235 connected to the specific division block 211 and the neighboring division blocks 210, 214, and 215 can be activated to provide electrical signal, and the remaining first sensing lines 221 to 225 and 236 to 240 can be deactivated.

At the same time, the second multiplexer 272 can connect the sensing circuit 275 to the plurality of second sensing lines 241 to 265 according to the third sensing control signal SCS3. Specifically, the second multiplexer 272 can connect the sensing circuit 275 to the second sensing lines 251 to 260 connected to the specific division block 211 and the neighboring division blocks 210, 214, and 215 among the plurality of second sensing lines 241 to 265. Accordingly, the second sensing lines 251 to 260 connected to the specific division block 211 and the neighboring division blocks 210, 214, and 215 are activated to provide electrical signal, and the remaining second sensing lines 246 to 250 and 261 to 265 can be deactivated.

The third sensing signal SRX3 generated from each of the plurality of sensing cells SS of each of the plurality of division blocks 201 to 220 can be provided to the sensing circuit 275 via the first sensing lines 226 to 235 and the first multiplexer 271 connected to the specific division block 211 and the neighboring division blocks 210, 214, and 215. The fourth sensing signal SRX4 generated from each of the plurality of sensing cells SS of each of the plurality of division blocks 201 to 220 can be provided to the sensing circuit 275 via the second sensing lines 251 to 260 and the second multiplexer 272 connected to the specific division block 211 and the neighboring division blocks 210, 214, and 215. As mentioned above, an electrical signal periodically provided from the active pen 10 is obtained as a third sensing signal SRX3 through the first sensing lines 226 to 235, and can be obtained as a fourth sensing signal SRX4 through the second sensing lines 251 to 260. The third sensing signal SRX3 and the fourth sensing signal SRX4 are simultaneously generated through the first sensing lines 226 to 235 and the second sensing lines 251 to 260 from each of the plurality of sensing cells SS. The third sensing signal SRX3 can be generated from the first sensing electrode of each of the plurality of sensing cells SS, and at the same time, the fourth sensing signal SRX4 can be generated from the second sensing electrode of each of the plurality of sensing cells SS. At this time, the third sensing signal SRX3 and the fourth sensing signal SRX4 can be different, but is not limited thereto. The third sensing signal SRX3 and the fourth sensing signal SRX4 can be provided to the sensing circuit 275 at the same time, but are not limited thereto.

The sensing circuit 275 can perform local sensing on the specific division block 211 and the neighboring division blocks 210, 214, and 215 based on the third sensing signal SRX3 and the fourth sensing signal SRX4. As the local sensing, the movement of the active pen 10 located on a specific division block 211 to one of the neighboring division blocks 210, 214, and 215 or to another division block can be tracked. As the local sensing, the intensity of pressure applied by the active pen 10 located on the specific division block 211 or the shape drawn on the contact surface can be tracked. In addition, for various inputs or functions of the active pen 10, the local sensing can be performed on a specific division block 211 or the neighboring division blocks 210, 214, and 215.

According to the embodiment, the section for detecting the presence or absence of the active pen 10 and local sensing can be significantly shortened compared to the sensing section T in the related art (FIG. 3). That is, according to the related art (FIG. 3), the driving signal STX can be provided through a plurality of first sensing lines Tx_1 to Tx_N during the first section t1 of the active pen sensing section T, and the sensing signal SRX can be received through a plurality of second sensing lines Rx_1 to Rx_M during the second section t2. According to the related art (FIG. 3), the active pen sensing section T was always used to detect the presence or absence of the active pen and detect the coordinates of the active pen. On the other hand, according to the embodiment (FIG. 6), since only half of the first active pen sensing section T3 is used to detect the presence or absence of the active pen 10, the time can be reduced by half or more compared to the related art (FIG. 3). Furthermore, even during local sensing, the time can be reduced by half or more compared to the related art (FIG. 3).

The local sensing is not disclosed in the related art (FIG. 3), and since the embodiment recognizes the operation of the active pen 10 through a local area through the local sensing, power consumption can be significantly reduced compared to the related art (FIG. 3).

Therefore, the embodiment can meet the requirements for high-resolution display and even higher driving frequency.

According to the embodiment, since the local sensing is performed on the specific division block 211 where the active pen 10 is located among the plurality of division blocks 201 to 220 and the neighboring division blocks 210, 214, and 215, power consumption can be dramatically reduced.

According to the embodiment, when local sensing for a specific division block 211 and the neighboring division blocks 210, 214, and 215, a sensing signal can be received not only through the second sensing lines 241 to 265 but also through the first sensing lines 221 to 240 connected to the specific division block 211 and the neighboring division blocks 210, 214, and 215. Therefore, more precise and accurate local sensing is possible by using the third sensing signal SRX3 received from the first sensing lines 221 to 240 and the fourth sensing signal SRX4 received from the second sensing lines 241 to 265, so that and errors due to sensing detection can be prevented in advance.

Meanwhile, as the active pen 10 moves, a new specific division block 211 and the neighboring division blocks 210, 214, and 215 can be determined.

Figure 12A:
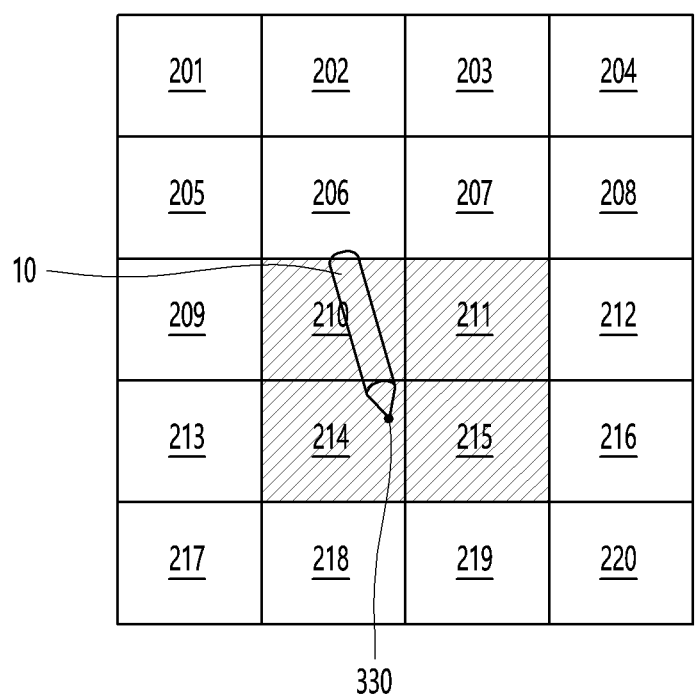
FIG. 12A shows neighboring division blocks at a first location of the active pen.
Figure 12B:
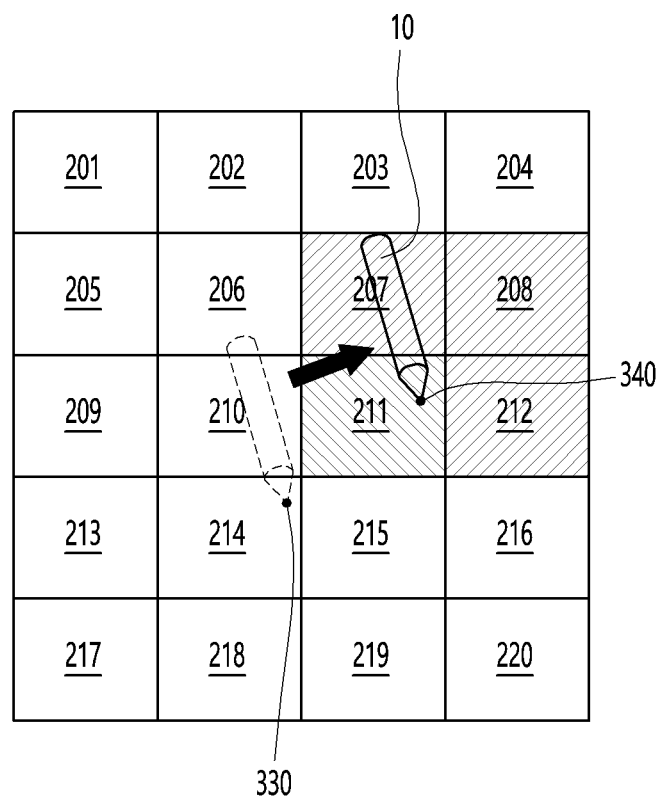
FIG. 12B shows newly determined neighboring division blocks when the active pen moves from a first location to a second location.
Figure 13:
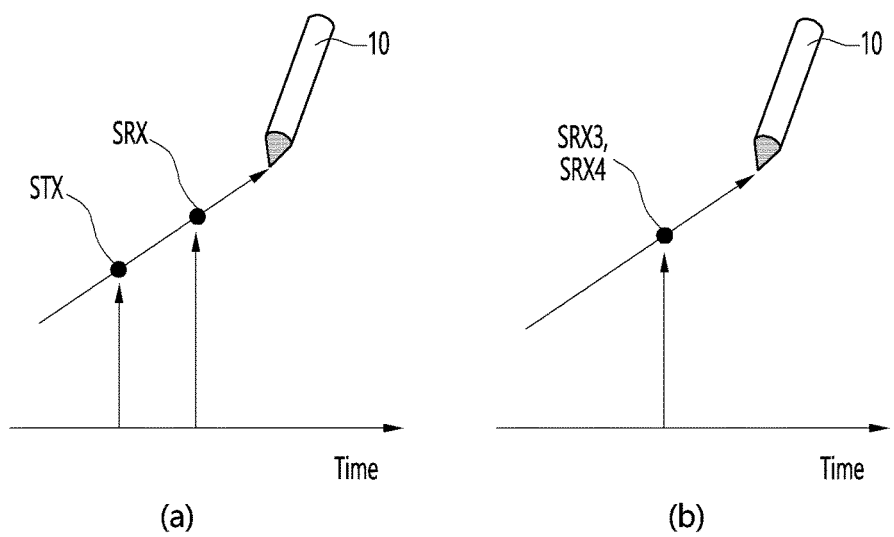
FIG. 13 shows (a) tracking of the active pen through the sensing time of the active pen according to the related art and (b) tracking of the active pen through the sensing time of the active pen according to an embodiment.

FIG. 12A shows neighboring division blocks at a first location of the active pen. FIG. 12B shows newly determined neighboring division blocks when the active pen moves from a first location to a second location.

As shown in FIG. 12A, the currently active pen 10 can be located on a specific division block 214. Since the active pen 10 is located northeast of the center point of the specific division block 214, the upper division block 210, the division block 211 in the northeast direction, and the right division block 215 based on the specific division block 214 can be determined as the neighboring division blocks 210, 214, and 215.

As shown in FIG. 12B, the active pen 10 can be moved from a first location 330 of the previous specific division block 214 to a second location 340 of the current specific division block 211. That is, the active pen 10 can be moved in the northeast direction. In this instance, the division block 211 in the northeast direction can be determined as a new specific division block. Since the active pen 10 is located in the new specific division block 211, the upper division block 207, the division block 208 in the northeast direction, and the right division block 212 of the new specific division block 211 can be determined as the new division blocks. While the new neighboring division blocks 207, 208 and 212 are determined, the existing specific division block 214 and the existing neighboring division blocks 210 and 215 can be excluded from the division blocks to perform local sensing, but is not limited thereto. The existing division blocks 210 and 215 can be located on opposite sides of the new neighboring division blocks 207, 208, and 212 based on the new specific division block 211.

According to the embodiment, as the active pen 10 moves, a new specific division block and the new neighboring division blocks can be determined, and the previous specific division block and the previous neighboring division blocks can be excluded. Accordingly, power consumption can be significantly reduced by performing local sensing on a small number of division blocks composed of a specific division block and the neighboring division blocks. Additionally, local sensing and follow-up operations to local sensing can be performed quickly, so that the sensing processing time can be shortened.

According to the embodiment, the tracking performance of the active pen 10 can be enhanced.

FIG. 13(a) shows tracking of the active pen through the sensing time of the active pen according to related art. FIG. 13(b) shows tracking of the active pen through the sensing time of the active pen according to an embodiment.

As shown in FIGS. 3 and 13(a), according to related art, the movement of the active pen 10 can be tracked by providing the driving signal STX to the sensing cell SS during the first section t1 of the active pen sensing section (T in FIG. 3) and receiving the sensing signal SRX from the sensing cell SS during the second section t2 of the active pen sensing section T. Therefore, in order to track the movement of the active pen 10, since it takes the entire time of the first section t1 and the second section t2 of the active pen sensing section T, movement tracking of the active pen 10 is not performed smoothly.

However, as shown in FIGS. 7 and 13(b), according to the embodiment, the time taken to track the movement of the active pen 10 can be one of the first section t1 and the second section t2 of the related art (FIG. 13(a)) or less.

For example, the third sensing signal SRX3 and the fourth sensing signal SRX4 can be simultaneously provided from the sensing cell SS during the first section t31 of the active pen sensing section (T3 in FIG. 7), so that the time can be significantly reduced compared to the related tart (FIG. 13(a)).

Accordingly, movement tracking of the active pen 10 can be smoothly performed. In particular, the coordinates of the active pen 10 can be detected more precisely and accurately based on the third sensing signal SRX3 and the fourth sensing signal SRX4, so that the performance of movement tracking of the active pen 10 can be improved.

Meanwhile, although not shown, when the active pen 10 deviates more than a predetermined distance above a specific division block while performing local sensing, the sensing driving device 270, that is, the sensing controller 273 (or sensing circuit 275), can stop performing local sensing and activate the plurality of first sensing lines 221 to 240 to detect the presence or absence of the active pen 10.

In other words, when the active pen 10 deviates more than a predetermined distance above a specific division block while performing local sensing, the sensing driving device 270 can perform an operation to stop performing local sensing and detect the presence or absence of the active pen 10 or its coordinates again.

The above detailed description should not be construed as limiting in all respects and should be considered illustrative. The scope of the embodiment should be determined by reasonable interpretation of the appended claims, and all changes within the equivalent range of the embodiment are included in the scope of the embodiment.

What is claimed is:

1. An active pen sensing device, comprising:
    a plurality of division blocks divided into a matrix along a first direction and a second direction intersecting the first direction, each of which comprises a plurality of sensing cells;
    a plurality of first sensing lines connected to the plurality of sensing cells of each of the plurality of division blocks along the first direction;
    a plurality of second sensing lines connected to the plurality of sensing cells of each of the plurality of division blocks along the second direction; and
    a sensing driving device connected to the plurality of first sensing lines and the plurality of second sensing lines and configured to drive the plurality of division blocks,
    wherein the sensing driving device is configured to:
    detect the presence or absence of an active pen by activating the plurality of first sensing lines,
    when the active pen is detected, detect coordinates of the active pen by activating the plurality of first sensing lines and the plurality of second sensing lines,
    when the coordinates of the active pen are detected, perform local sensing by activating the first sensing lines and the second sensing lines connected to a specific division block at a first location where the active pen is located and first neighboring division blocks, and
    when the active pen moves from the first location to a second location while performing the local sensing, determine a specific division block at the second location where the active pen is newly located as a new specific division block, determine second neighboring division blocks located around the new specific division block based on a movement direction of the active pen, and exclude the first neighboring division blocks located on opposite sides of the second neighboring division blocks based on the new specific division block.

2. The active pen sensing device of claim 1, wherein the sensing driving device is configured to:

receive a first sensing signal through the plurality of first sensing lines to detect the presence or absence of the active pen during one section of a first active pen sensing section.

3. The active pen sensing device of claim 1, wherein a second active pen sensing section comprises a first section and a second section, and
when the active pen is detected, the sensing driving device is configured to:
provide a driving signal to the plurality of first sensing lines during the first section and receive a second sensing signal through the plurality of second sensing lines during the second section.

4. The active pen sensing device of claim 1, wherein when the coordinates of the active pen are detected, the sensing driving device is configured to:
determine the first neighboring division blocks based on a current location of the active pen from a center point of the specific division block, and
simultaneously receive a third sensing signal and a fourth sensing signal through the plurality of first sensing lines and the plurality of second sensing lines, respectively, connected to the specific division block and the determined first neighboring division blocks during one section of a third active pen sensing section.

5. The active pen sensing device of claim 1, wherein the sensing driving device comprises:
a first multiplexer connected to the plurality of first sensing lines;
a second multiplexer connected to the plurality of second sensing lines; and
a sensing controller configured to control the first multiplexer and the second multiplexer.

6. The active pen sensing device of claim 5, wherein the sensing driving device is configured to:
control the first multiplexer according to a first sensing control signal generated to detect the presence or absence of the active pen to receive a first sensing signal through the plurality of first sensing lines.

7. The active pen sensing device of claim 5, wherein the sensing driving device is configured to:
control the first multiplexer according to a second sensing control signal generated to detect the coordinates of the active pen to provide a driving signal to the plurality of first sensing lines, and
control the second multiplexer according to the second sensing control signal to receive a second sensing signal through the plurality of second sensing lines.

8. The active pen sensing device of claim 5, wherein the sensing driving device is configured to:
control the first multiplexer and the second multiplexer according to a third sensing control signal generated to perform the local sensing to simultaneously a third sensing signal and a fourth sensing signal through the plurality of first sensing lines and the plurality of second sensing lines.

9. The active pen sensing device of claim 1, wherein when the active pen deviates more than a predetermined distance from the specific division block while performing the local sensing, the sensing driving device is configured to:
stop performing the local sensing and activate the plurality of first sensing lines to detect the presence or absence of the active pen.

10. The active pen sensing device of claim 1, wherein the first neighboring division blocks comprise two or more blocks adjacent to the specific division block.

11. A sensing driving method in an active pen sensing device comprising a plurality of division blocks divided into a matrix along a first direction and a second direction intersecting the first direction, each of which comprises a plurality of sensing cells, a plurality of first sensing lines connected to the plurality of sensing cells of each of the plurality of division blocks along the first direction, a plurality of second sensing lines connected to the plurality of sensing cells of each of the plurality of division blocks along the second direction, and a sensing driving device connected to the plurality of first sensing lines and the plurality of second sensing lines to drive the plurality of division blocks, comprising:
detecting the presence or absence of an active pen by activating the plurality of first sensing lines;
when the active pen is detected, detecting coordinates of the active pen by activating the plurality of first sensing lines and the plurality of second sensing lines;
when the coordinates of the active pen are detected, performing local sensing by activating the first sensing lines and the second sensing lines connected to a specific division block at a first location where the active pen is located and first neighboring division blocks, and
when the active pen moves from the first location to a second location while performing the local sensing, determine a specific division block at the second location where the active pen is newly located as a new specific division block, determine second neighboring division blocks located around the new specific division block based on a movement direction of the active pen, and exclude the first neighboring division blocks located on opposite sides of the second neighboring division blocks based on the new specific division block.

12. The sensing driving method of claim 11, wherein the detecting of the presence or absence of the active pen comprises:
receiving a first sensing signal through the plurality of first sensing lines to detect the presence or absence of the active pen during one section of a first active pen sensing section.

13. The sensing driving method of claim 11, wherein a second active pen sensing section comprises a first section and a second section, and
the detecting of the coordinates of the active pen comprises:
when the active pen is detected, providing a driving signal to the plurality of first sensing lines during the first section and receiving a second sensing signal through the plurality of second sensing lines during the second section.

14. The sensing driving method of claim 11, wherein the performing of the local sensing comprises:
when the coordinates of the active pen are detected, determining the first neighboring division blocks based on a current location of the active pen from a center point of the specific division block; and
simultaneously receiving a third sensing signal and a fourth sensing signal through the plurality of first sensing lines and the plurality of second sensing lines, respectively, connected to the specific division block and the determined first neighboring division blocks during one section of a third active pen sensing section.

15. A display device, comprising:
a panel; and an active pen sensing device configured to detect a touch or proximity of an active pen to the panel, wherein the active pen sensing device comprises:

a plurality of division blocks divided into a matrix along a first direction and a second direction intersecting the first direction, each of which comprises a plurality of sensing cells;

a plurality of first sensing lines connected to the plurality of sensing cells of each of the plurality of division blocks along the first direction;

a plurality of second sensing lines connected to the plurality of sensing cells of each of the plurality of division blocks along the second direction; and a sensing driving device connected to the plurality of first sensing lines and the plurality of second sensing lines and configured to drive the plurality of division blocks, wherein the sensing driving device is configured to:

detect the presence or absence of the active pen by activating the plurality of first sensing lines, when the active pen is detected, detect coordinates of the active pen by activating the plurality of first sensing lines and the plurality of second sensing lines, when the coordinates of the active pen are detected, perform local sensing by activating the first sensing lines and the second sensing lines connected to a specific division block at a first location where the active pen is located and first neighboring division blocks, and when the active pen moves from the first location to a second location while performing the local sensing, determine a specific division block at the second location where the active pen is newly located as a new specific division block, determine second neighboring division blocks located around the new specific division block based on a movement direction of the active pen, and exclude the first neighboring division blocks located on opposite sides of the second neighboring division blocks based on the new specific division block.

16. The display device of claim 15, wherein the sensing driving device is configured to:

receive a first sensing signal through the plurality of first sensing lines to detect the presence or absence of the active pen during one section of a first active pen sensing section.

17. The display device of claim 15, wherein a second active pen sensing section comprises a first section and a second section, and when the active pen is detected, the sensing driving device is configured to:

provide a driving signal to the plurality of first sensing lines during the first section and receive a second sensing signal through the plurality of second sensing lines during the second section.

18. The display device of claim 15, wherein when the coordinates of the active pen are detected, the sensing driving device is configured to:

determine the first neighboring division blocks based on a current location of the active pen from a center point of the specific division block, and simultaneously receive a third sensing signal and a fourth sensing signal through the plurality of first sensing lines and the plurality of second sensing lines, respectively, connected to the specific division block and the determined first neighboring division blocks during one section of a third active pen sensing section.

* * * * *